US012156847B2

(12) United States Patent
Illindala

(10) Patent No.: US 12,156,847 B2
(45) **Date of Patent: *Dec. 3, 2024**

(54) CPR GURNEY

(71) Applicant: ZOLL Circulation, Inc., San Jose, CA (US)

(72) Inventor: Uday Kiran V. Illindala, San Jose, CA (US)

(73) Assignee: ZOLL Circulation, Inc., San Jose, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/955,160

(22) Filed: Sep. 28, 2022

(65) Prior Publication Data

US 2023/0093378 A1 Mar. 23, 2023

Related U.S. Application Data

(63) Continuation of application No. 16/750,674, filed on Jan. 23, 2020, now Pat. No. 11,497,677, which is a continuation of application No. 15/360,473, filed on Nov. 23, 2016, now Pat. No. 10,568,805, which is a (Continued)

(51) Int. Cl.

*A61H 31/00* (2006.01)
*A61G 1/04* (2006.01)
*A61G 1/02* (2006.01)
*A61H 11/00* (2006.01)

(52) U.S. Cl.

CPC ............. *A61H 31/006* (2013.01); *A61G 1/04* (2013.01); *A61H 31/004* (2013.01); *A61H 31/008* (2013.01); *A61G 1/0212* (2013.01); *A61H 2011/005* (2013.01); *A61H 2201/0142* (2013.01); *A61H 2201/1246* (2013.01); *A61H 2201/5061* (2013.01)

(58) Field of Classification Search

CPC .. A61H 31/006; A61H 31/004; A61H 31/008; A61H 2011/005; A61H 2201/0142; A61H 2201/1246; A61H 2201/5061; A61G 1/04; A61G 1/0212

See application file for complete search history.

(56) References Cited

U.S. PATENT DOCUMENTS

| | | | |
|---|---|---|---|
| 3,489,140 | A | 1/1970 | Mullikin |
| 3,610,233 | A | 10/1971 | Barkalow |
| 3,739,771 | A | 6/1973 | Gaquer et al. |

(Continued)

FOREIGN PATENT DOCUMENTS

| | | |
|---|---|---|
| WO | 2008144862 | 12/2008 |
| WO | 2010119401 | 10/2010 |

OTHER PUBLICATIONS

International Search Report dated Jul. 23, 2014 from International Application No. PCT/US2014/026661 (in related U.S. Appl. No. 16/750,674).

(Continued)

*Primary Examiner* — Steven O Douglas
(74) *Attorney, Agent, or Firm* — Finch & Maloney PLLC

(57) ABSTRACT

A mechanical chest compression device is secured to a gurney, transport stretcher or ambulance cot while engaging a patient's thorax to provide mechanical CPR during transport. The mechanical chest compression device compresses the patient's thorax against the gurney deck. The mechanical chest compression device may engage the side rails on the gurney, the gurney deck or any suitable structural elements of the gurney.

19 Claims, 5 Drawing Sheets

Related U.S. Application Data continuation of application No. 13/827,743, filed on Mar. 14, 2013, now Pat. No. 9,504,626.

(56) References Cited

U.S. PATENT DOCUMENTS

| | | | |
|---|---|---|---|
| 4,060,079 | A | 11/1977 | Reinhold, Jr. |
| 4,977,630 | A | 12/1990 | Oswalt et al. |
| 5,400,448 | A | 3/1995 | Zwickey |
| 5,738,637 | A | 4/1998 | Kelly et al. |
| 5,743,864 | A | 4/1998 | Baldwin, II |
| 6,066,106 | A | 5/2000 | Sherman et al. |
| 6,142,962 | A | 11/2000 | Mollenauer et al. |
| 6,332,872 | B1 | 12/2001 | Young |
| 6,398,745 | B1 | 6/2002 | Sherman et al. |
| 6,616,620 | B2 | 9/2003 | Sherman et al. |
| 7,211,056 | B2 | 5/2007 | Petelenz et al. |
| 7,226,427 | B2 | 6/2007 | Steen |
| 7,347,832 | B2 | 3/2008 | Jensen et al. |
| 7,354,407 | B2 | 4/2008 | Quintana et al. |
| 7,410,470 | B2 | 8/2008 | Escudero et al. |
| 7,569,021 | B2 | 8/2009 | Sebelius et al. |
| 8,777,879 | B2 | 7/2014 | Johnson |
| 8,795,209 | B2 | 8/2014 | Herken et al. |
| 8,942,803 | B1 | 1/2015 | Herken et al. |
| 9,107,800 | B2 | 8/2015 | Sebelius et al. |
| 9,504,626 | B2 | 11/2016 | Illindala |
| 10,568,805 | B2 | 2/2020 | Illindala |
| 2004/0162510 | A1 | 8/2004 | Jayne et al. |
| 2008/0097257 | A1 | 4/2008 | Stromsnes |
| 2008/0146975 | A1 | 6/2008 | Ho et al. |
| 2009/0234255 | A1 | 9/2009 | Votel |
| 2009/0260637 | A1 | 10/2009 | Sebelius et al. |
| 2010/0004572 | A1 | 1/2010 | King |
| 2010/0063425 | A1 | 3/2010 | King et al. |
| 2010/0185127 | A1 | 7/2010 | Nilsson et al. |
| 2014/0121576 | A1 | 5/2014 | Nilsson et al. |
| 2014/0276269 | A1 | 9/2014 | Illindala |
| 2017/0071820 | A1 | 3/2017 | Illindala |

OTHER PUBLICATIONS

Extended European Search Report dated Nov. 3, 2016 from European U.S. Appl. No. 16/750,674 (in related U.S. Appl. No. 16/750,674).

Non-Final Office Action mailed on Apr. 21, 2022 in related U.S. Appl. No. 16/750,674.

Notice of Allowance mailed on Jun. 30, 2022 in related U.S. Appl. No. 16/750,674.

CPR GURNEY

RELATED APPLICATIONS

This application is a continuation of and claims the benefit of priority from U.S. patent application Ser. No. 16/750,674, filed on Jan. 23, 2020, which is a continuation of and claims the benefit of priority from U.S. patent application Ser. No. 15/360,473, filed on Nov. 23, 2016 now U.S. Pat. No. 10,568,805, which is a continuation of and claims the benefit of priority from U.S. patent application Ser. No. 13/827,743, filed Mar. 14, 2013 now U.S. Pat. No. 9,504,626, the full disclosures of which are incorporated herein by reference.

FIELD OF THE INVENTIONS

The inventions described below relate to the field of CPR chest compression devices.

BACKGROUND OF THE INVENTIONS

Cardiopulmonary resuscitation (CPR) is a well-known and valuable method of first aid used to resuscitate people who have suffered from cardiac arrest. CPR requires repetitive chest compressions to squeeze the heart and the thoracic cavity to pump blood through the body. Artificial respiration, such as mouth-to-mouth breathing or bag mask respiration, is used to supply air to the lungs. When a first aid provider performs manual chest compression effectively, blood flow in the body is about 25% to 30% of normal blood flow.

In efforts to provide better blood flow and increase the effectiveness of bystander resuscitation efforts, various mechanical devices have been proposed for performing CPR.

Piston based chest compression systems are illustrated in Nilsson, et al., CPR Device and Method, U.S. Patent Publication 2010/0185127 (Jul. 22, 2010), Sebelius, et al., Support Structure, U.S. Patent Publication 2009/0260637 (Oct. 22, 2009), Sebelius, et al., Rigid Support Structure on Two Legs for CPR, U.S. Pat. No. 7,569,021 (Aug. 4, 2009), Steen, Systems and Procedures for Treating Cardiac Arrest, U.S. Pat. No. 7,226,427 (Jun. 5, 2007) and King, Gas-Driven Chest Compression Device, U.S. Patent Publication 2010/0004572 (Jan. 7, 2010) all of which are hereby incorporated by reference.

In another variation of such devices, a belt is placed around the patient's chest and the belt is used to effect chest compressions. Our own patents, Mollenauer et al., Resuscitation device having a motor driven belt to constrict/compress the chest, U.S. Pat. No. 6,142,962 (Nov. 7, 2000); Sherman, et al., CPR Assist Device with Pressure Bladder Feedback, U.S. Pat. No. 6,616,620 (Sep. 9, 2003); Sherman et al., Modular CPR assist device, U.S. Pat. No. 6,066,106 (May 23, 2000); and Sherman et al., Modular CPR assist device, U.S. Pat. No. 6,398,745 (Jun. 4, 2002), and Escudero, et al., Compression Belt System for Use with Chest Compression Devices, U.S. Pat. No. 7,410,470 (Aug. 12, 2008), show chest compression devices that compress a patient's chest with a belt. Our commercial device, sold under the trademark AUTOPULSE®, is described in some detail in our prior patents, including Jensen, Lightweight Electro-Mechanical Chest Compression Device, U.S. Pat. No. 7,347,832 (Mar. 25, 2008) and Quintana, et al., Methods and Devices for Attaching a Belt Cartridge to a Chest Compression Device, U.S. Pat. No. 7,354,407 (Apr. 8, 2008). Each of these patents is hereby incorporated by reference in their entirety.

In most scenarios in which CPR is required to treat cardiac arrest, it is also necessary to transport the patient. The patient may also have coincident injuries, such as broken vertebrae or broken hip, that require immobilization. The patient may need to be transported over rugged terrain, up or down stairs. In these scenarios, it would be beneficial to provide automated CPR chest compressions while also transporting and immobilizing the patient. However, conventional gurneys do not work well with available chest compression devices. The components of each device interfere to the extent that they cannot be combined effectively.

SUMMARY

The devices and methods described below provide for patient support and transportation and simultaneous performance of mechanical CPR. A piston-based chest compression device is secured to a gurney, transport stretcher or ambulance cot while engaging a patient's thorax to provide mechanical CPR. The piston-based chest compression device compresses the patient's chest against the gurney deck or any generally suitable mattress, cushion or pad on the gurney deck. The piston-based chest compression device engages the side rails on the gurney to perform chest compressions.

Alternatively, slots through the cushion and the gurney deck enable the ends of the CPR support structure to pass through the cushion to engage the gurney deck or any other suitable structural elements of the gurney frame.

Alternatively, the gurney deck operates as a generally rigid base that includes all the necessary mechanisms for performing mechanical CPR with a belt. The upper surface of the deck supports any suitable mattress, cushion or pad. Slots through the pad enable the ends of the belt to pass through the pad and encircle the patient's thorax for performance of mechanical CPR. A suitable belt drive system may be incorporated into the gurney deck and include a drive spool operably attached to the deck structure as well as a means for rotating the drive spool, with the means for rotating disposed within the deck and operably attached to the drive spool.

The devices enable a method for simultaneously transporting and treating a patient requiring CPR which includes the steps of providing a mechanical chest compression device embedded in, or secured to a gurney. A patient requiring CPR is placed, supine, on the gurney and the mechanical CPR device engages the patient's thorax. The mechanical chest compression device is then activated to repetitively perform chest compressions.

The new apparatus for transporting and treating a patient includes a gurney frame supporting a rigid gurney deck with at least two side rails secured to the gurney frame. A piston driven chest compression device for repetitively compressing the chest of a patient is supported by two legs, each of the two legs engaging one of the side rails with the piston apposing the patient's chest. Optionally, a pad may be used between the patient and the gurney deck.

The new apparatus for transporting and treating a patient may instead include a gurney frame supporting a generally planar rigid patient support platform having at least two access ports through the patient support platform. A piston driven chest compression device for repetitively compressing the chest of a patient with a chest compression unit driving a piston is supported by two legs, each of the two legs extending through the access ports to engage the gurney frame.

The new method for transporting and treating a patient on a gurney includes the steps of providing a gurney frame supporting a rigid gurney deck and having at least two side rails movably secured to the gurney frame, then providing a piston driven chest compression device for repetitively compressing the chest of a patient with a chest compression unit driving a piston, the chest compression unit is supported by at least two legs, each of the two legs engaging one of the at least two side rails with the piston apposing the patient's chest, and placing the patient supine on the gurney deck and then securing the means for mechanically compressing the chest of the patient to the at least two side rails with the piston apposing the patient's chest and activating the means for mechanically compressing the chest to repetitively perform chest compressions.

DETAILED DESCRIPTION OF THE INVENTIONS

Figure 1:
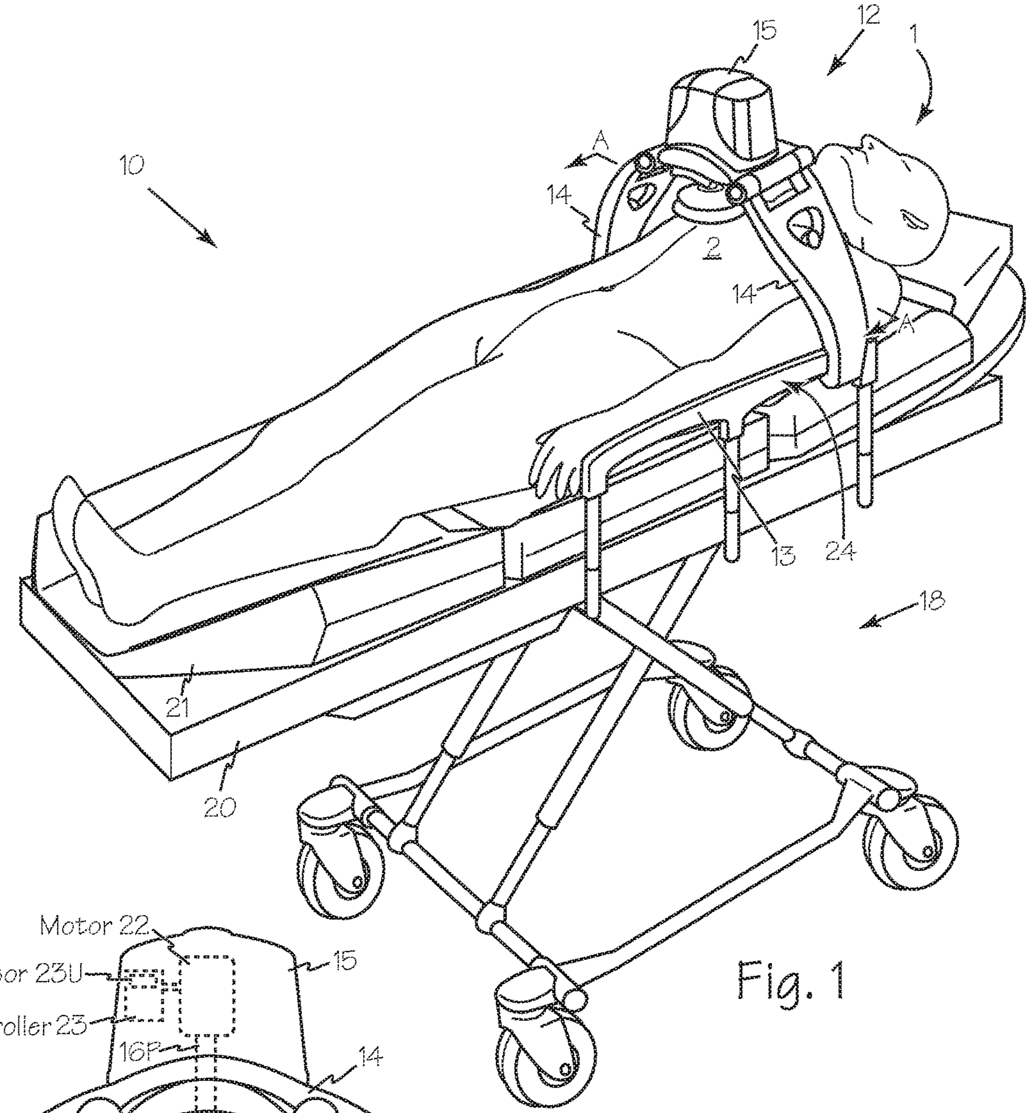
FIG. 1 is a perspective view of a piston-based chest compression device engaging the side rails of a transport gurney.
Figure 2:
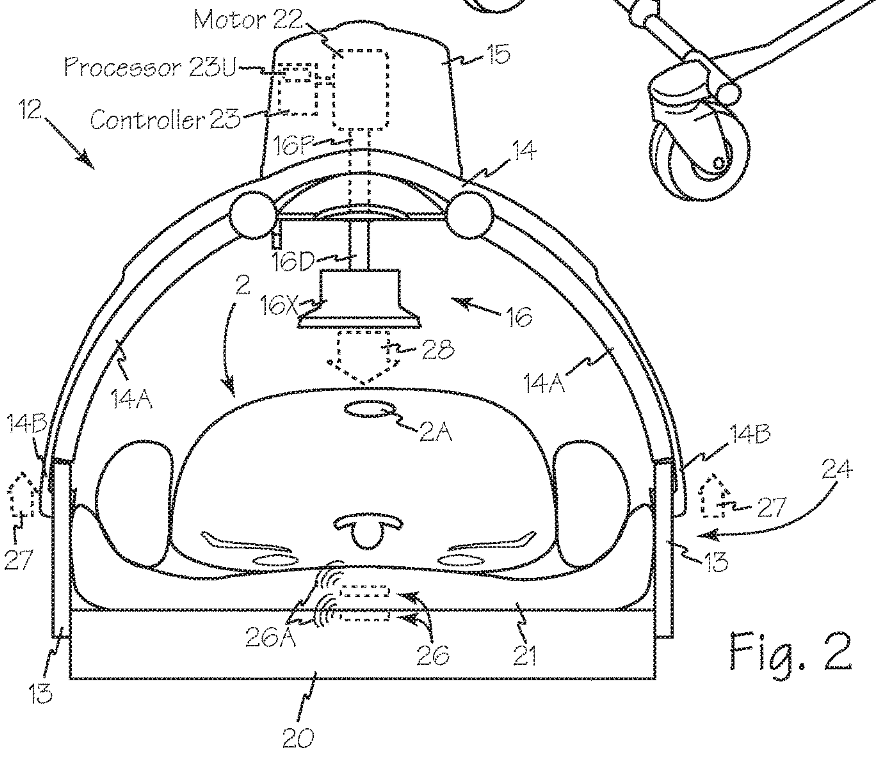
FIG. 2 is a cross-section view of the gurney and patient of FIG. 1 taken along A-A.

FIG. 1 is a perspective view of supine patient 1 on transport gurney 10 with piston driven chest compression device 12 engaging side rails 13. FIG. 2 is a cross-section view of the gurney and patient of FIG. 1 taken along A-A showing landmark skeletal structures. Chest compression device 12 is oriented to apply compressions to the chest 2 of patient 1 while the patient is supported in transport gurney 10. Chest compression device 12 includes support structure or legs 14 which supports and orients chest compression unit 15 and plunger 16 apposing sternum 2A. Transport gurney 10 includes any suitable wheeled support frame 18 supporting a table, support platform or deck such as deck 20 and movably engaging side rails such a side rails 13. Transport gurney 10 may also include a suitable mattress, cushion or pad such as pad 21.

Chest compression unit 15 includes any suitable drive means such as motor 22 which may be an electromotor, a hydraulic motor, a linear, pneumatic or hydraulic actuator or the like. Plunger 16 has a distal end 16D and a proximal end 16P, and proximal end 16P of the plunger is operably coupled to motor 22. Plunger 16 extends from and withdraws into the housing upon operation of motor 22 causing plunger tip 16X to apply compressive force 28 to chest 2 directly over sternum 2A. A motor control unit or controller 23 is operably connected to motor 22 and includes a microprocessor 23U to control the operation of the motor and the plunger and one or more of firmware routines or instruction sets to enable the controller to initially orient the piston or compression components to the patient's sternum and cyclically and repetitively compress the patient's chest.

Chest compression device 12 engages side rails 13 from external or outside 24. Leg 14 may include support element 14A which rests on side rail 13 and stabilizes chest compression device 12. Leg 14 further includes engagement element or hook 14B to frictionally secure leg 14 to side rail 13 exerting retention force 27 to counter compression force 28 exerted by chest compression device 12. One or more force sensors such as force sensor 26 may be incorporated into the deck or the pad to measure the force applied by the chest compression unit to the patient's thorax. The output of the force sensors, sensor data 26A may be used by compression unit 15 to adjust the force applied to the patient. Similarly, force data 26A may also be provided to the device operator.

Figure 4:
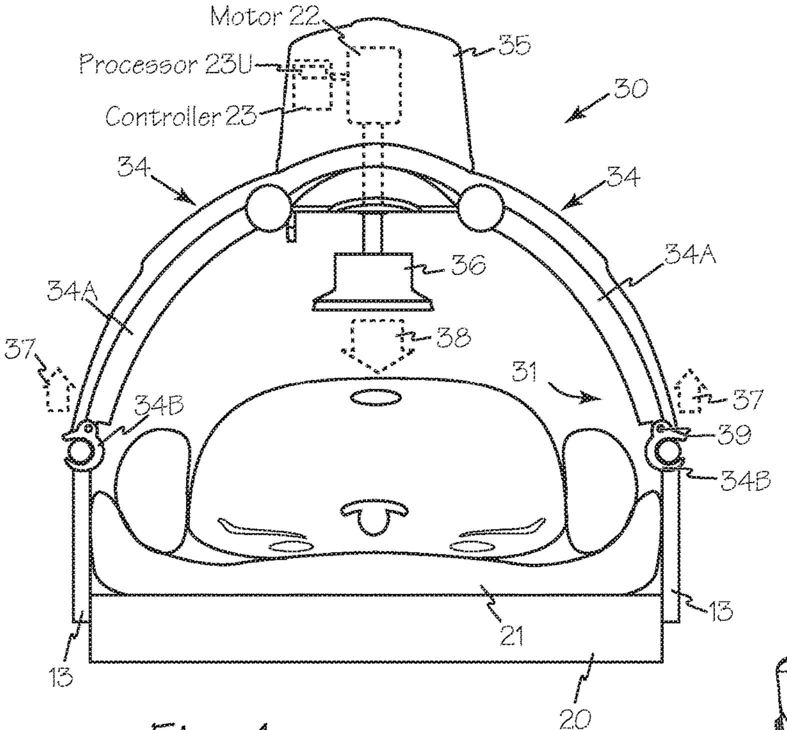
FIG. 4 is a cross-section view of the gurney and patient of FIG. 3 taken along B-B.
Figure 3:
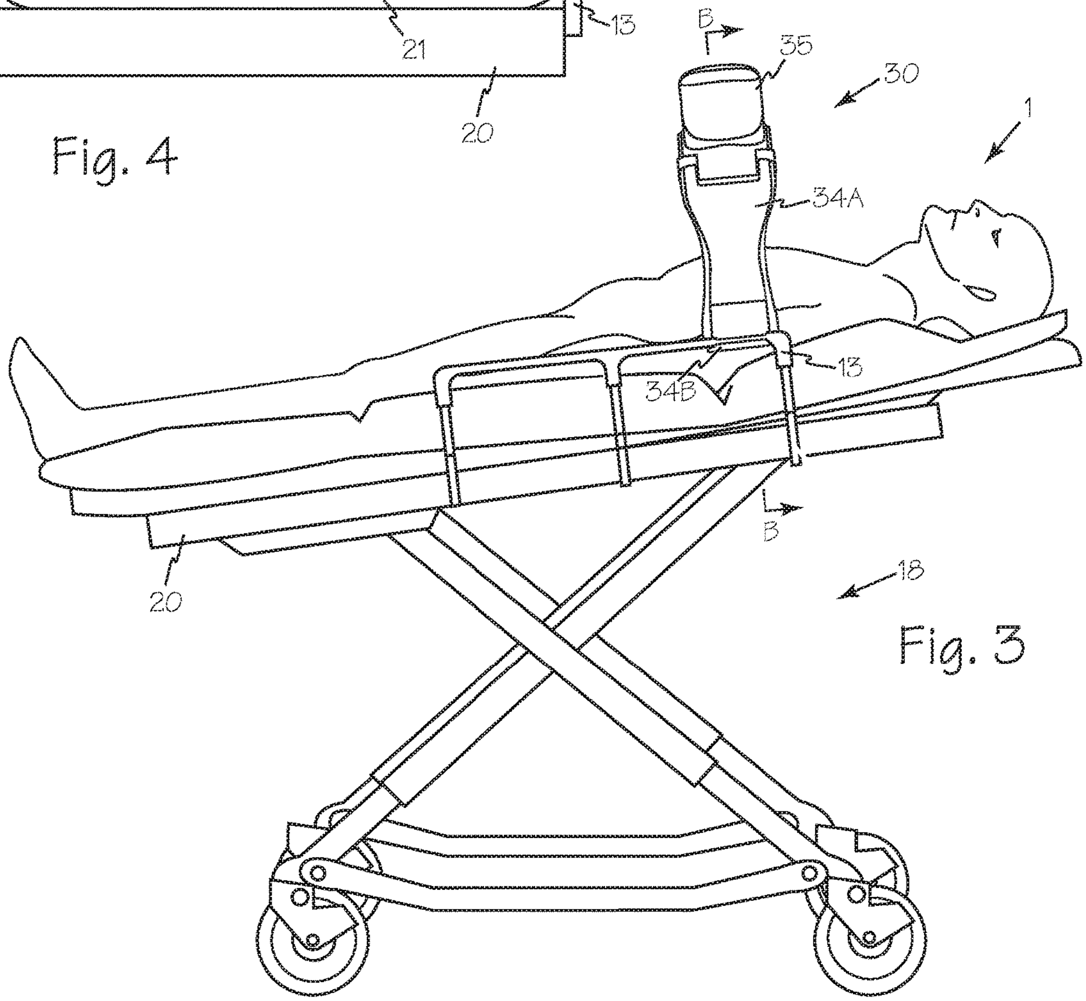
FIG. 3 is a side view of a piston-based chest compression device engaging the side rails of a transport gurney.

FIGS. 3 and 4 illustrate chest compression device 30 engaging side rails 13 from the patient side or in-side 31. Chest compression device 30 includes support structure or legs 34 which supports and orients chest compression unit 35 and plunger 36 apposing sternum 2A. Leg 34 includes support element 34A which rests on side rail 13 and stabilizes chest compression device 30. Leg 34 further includes claw-like engagement element or hook 34B to frictionally secure leg 34 to side rail 13 exerting retention force 37 to counter compression force 38 exerted by chest compression device 30. Hooks or engagement elements such as hooks 34B may be pivotally secured with pins 39, or other suitable devices, to the support structure or legs 34 of the chest compression device 30.

Figure 5:
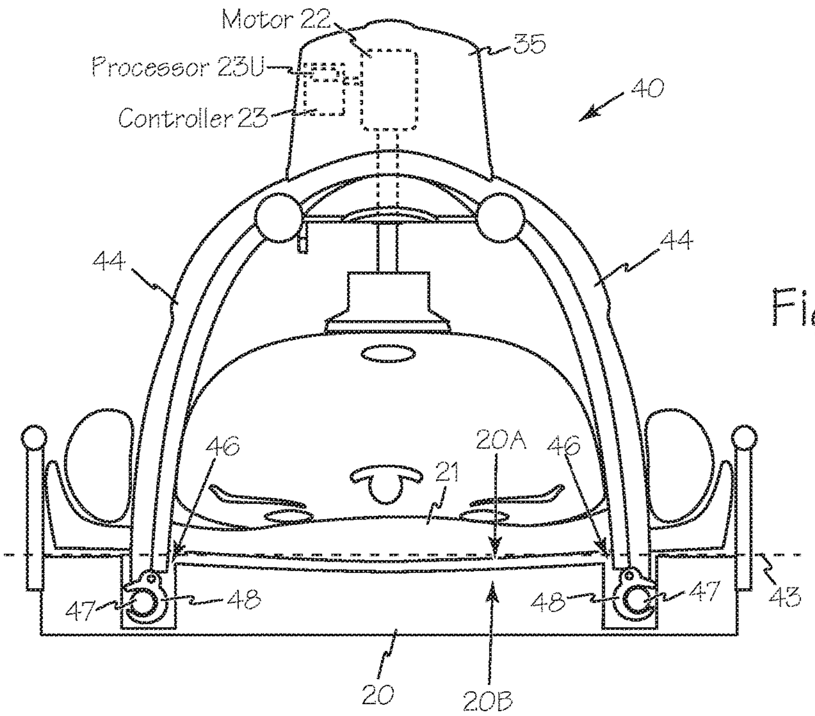
FIG. 5 is a cross-section view of a patient and gurney with a mechanical CPR device engaging the gurney deck.
Figure 6:
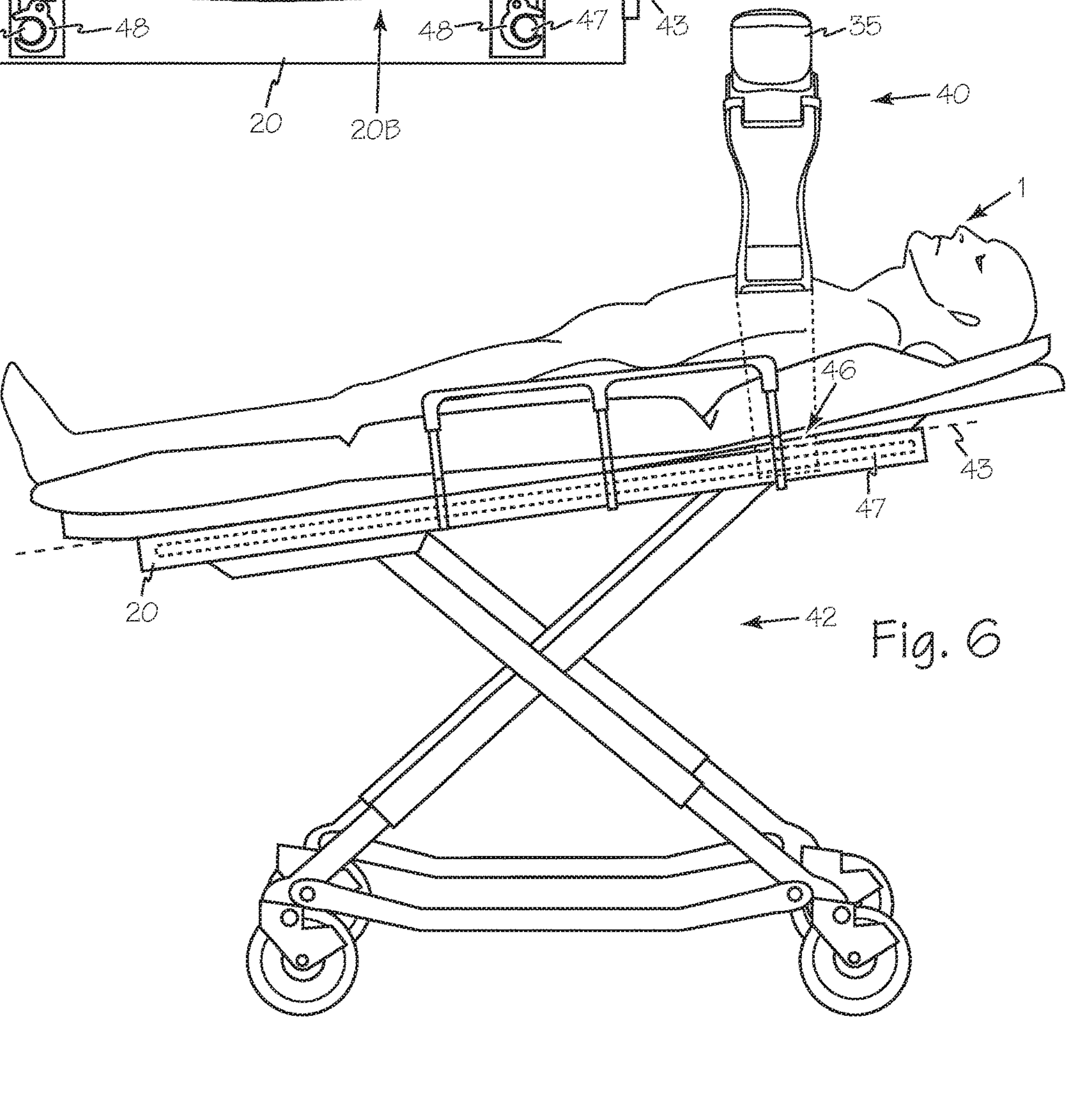
FIG. 6 is a side view of the patient, gurney and mechanical CPR device of FIG. 5.

Chest compression device 40 of FIGS. 5 and 6 engages any suitable structural component of gurney 42 below plane 43 of patient support platform 20. Support platform 20 has a patient support side 20A and a lower side 20B. Here, support legs 44 of chest compression device 40 extend through access ports 46 of patient support platform 20, from support side 20A through the platform to lower side 20B, to engage frame 47 using hooks 48.

Figure 7:
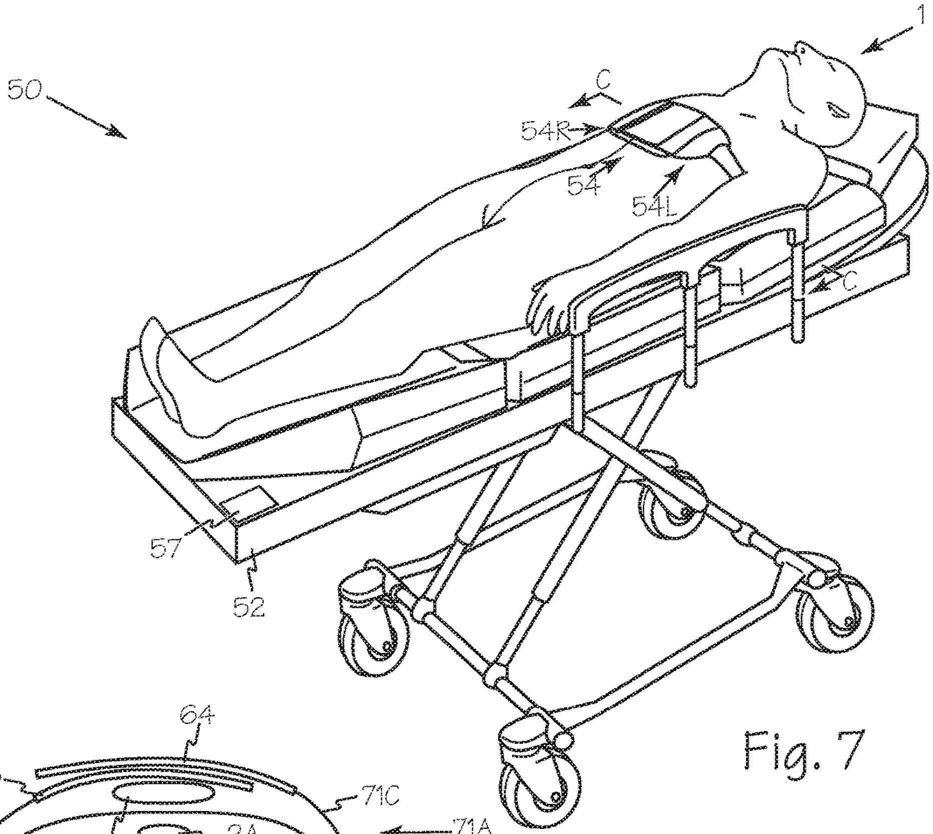
FIG. 7 is a perspective view of a belt driven chest compression device engaging a patient on a transport gurney.
Figure 8:
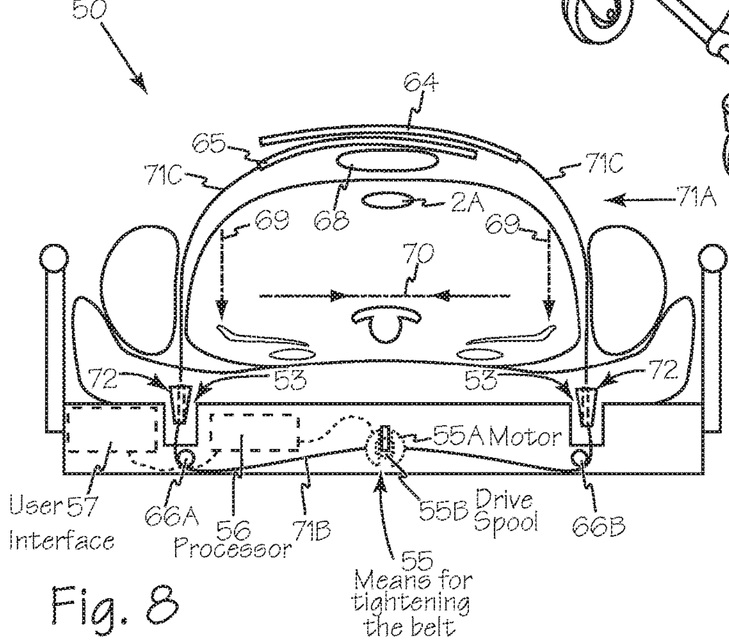
FIG. 8 is a cross-section view of the gurney and patient of FIG. 7 taken along C-C.

Chest compression gurney 50 of FIGS. 7 and 8 includes a belt driven chest compression elements integrated within gurney deck 52. Deck 52 has two or more openings, ports or passages as ports 53 to permit passage of belt 54 through deck 52. Chest compression belt 54 is fitted on supine patient 1. Chest compression gurney 50 applies compressions with the belt 54, which has a right belt portion 54R and a left belt portion 54L. Deck 52 operates as a housing upon which the patient rests and a means for tightening the belt 55, a processor 56 and a user interface 57 are disposed in the deck. Belt 54 includes pull straps 71C connected to wide load distribution sections 64 and 65 at the ends of the belt. The means for tightening the belt 55 includes a motor 55A attached to a drive spool 55B, around which the belt spools and tightens during use. The belt 54 extends from the drive spool 55B, around the spindles 66A and 66B and around the patient's thorax 3. In use, the drive spool tightens the belt as the motor turns the drive spool, thereby compressing the patient's chest. Spindles 66A and 66B are laterally spaced from each other to control the force profile of the compression belt. Here, the spindles are located several inches laterally of the spine, and lie under the scapula or trapezius region of the patient. This location alters the force profile of the belt, creating a generally anterior-posterior compression or sternal compression on the thorax, in contrast to the circumferential compression provided by conventional belt driven chest compression devices.

In addition to the spindles under the patient's scapulae, bladder 68 may be optionally installed between the patient and the belt sections 64 and 65. With bladder 68 in position, the thorax is maintained in a somewhat oval cross section, and is preferentially compressed in the front to back direction along arrows 69. Some patients, for unknown reasons, tend to compress more readily from the sides, resulting in the rounder shape in the cross section of the torso during chest compressions. Using the bladder avoids the tendency in some patients to compress into a rounder cross section compressed excessively in the lateral dimension direction (line 70), thus potentially lifting sternum 2A upwardly.

Figure 9:
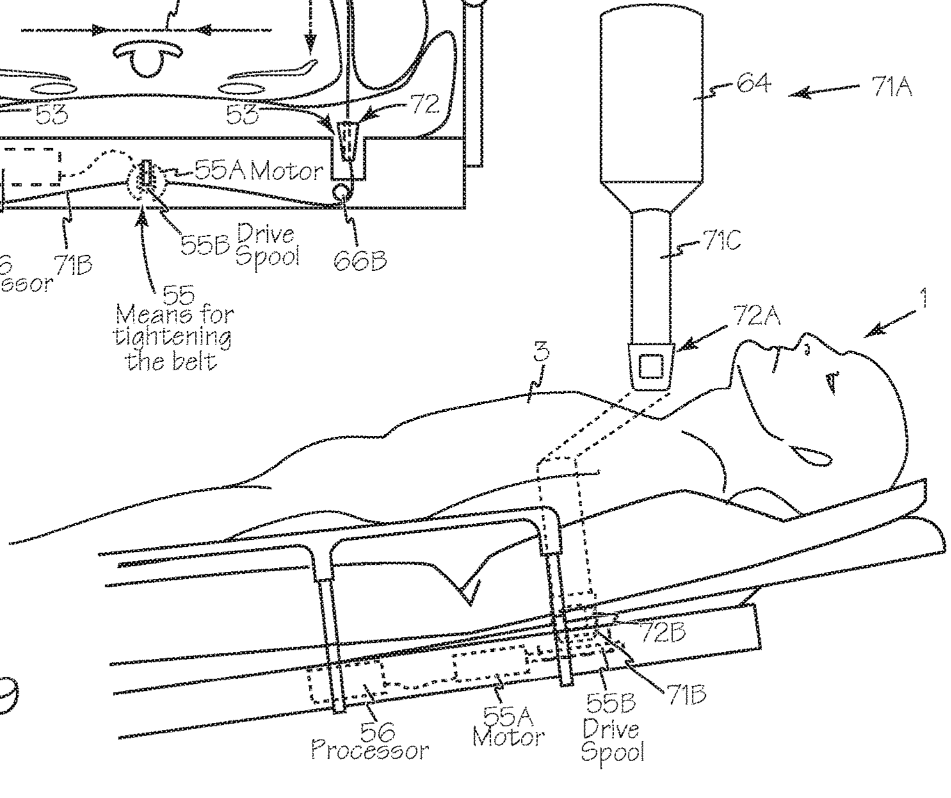
FIG. 9 is a close-up side view of the gurney and patient of FIG. 7.

Referring now to FIGS. 8 and 9, as an option, belt 54 may be replaced by upper belt section 71A and lower belt section 71B. Upper belt section 71A may be removably secured to lower belt section 71B using optional fastener 72 which may be any suitable fastener system such as buckles, clips or hook and loop elements. A fastener such as fastener 72A secured to pull strap 71C removably engages complimentary fastener 72B which is secured to lower belt section 71B. The removable fasteners enable replacement of upper belt section 71A for different patients to accommodate different patient sizes as well as sterilization concerns.

Figure 10:
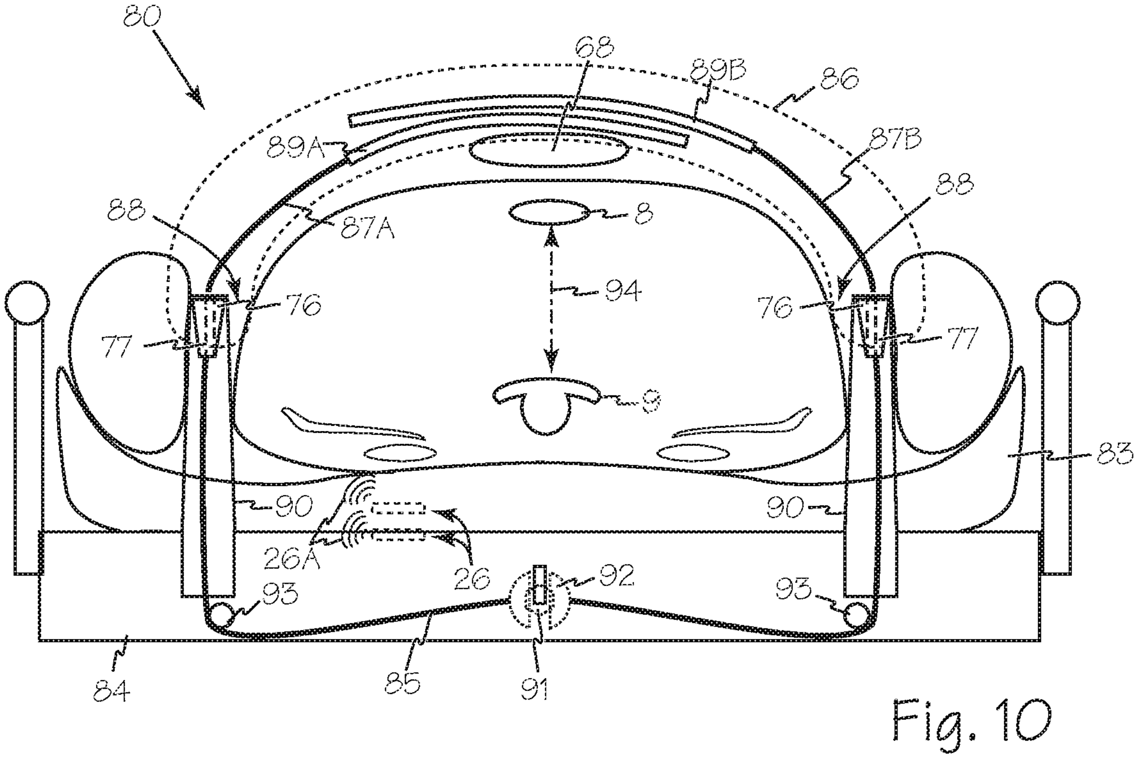
FIG. 10 is a cross-section view of the gurney and patient of FIG. 7 with the patient's chest uncompressed.
Figure 11:
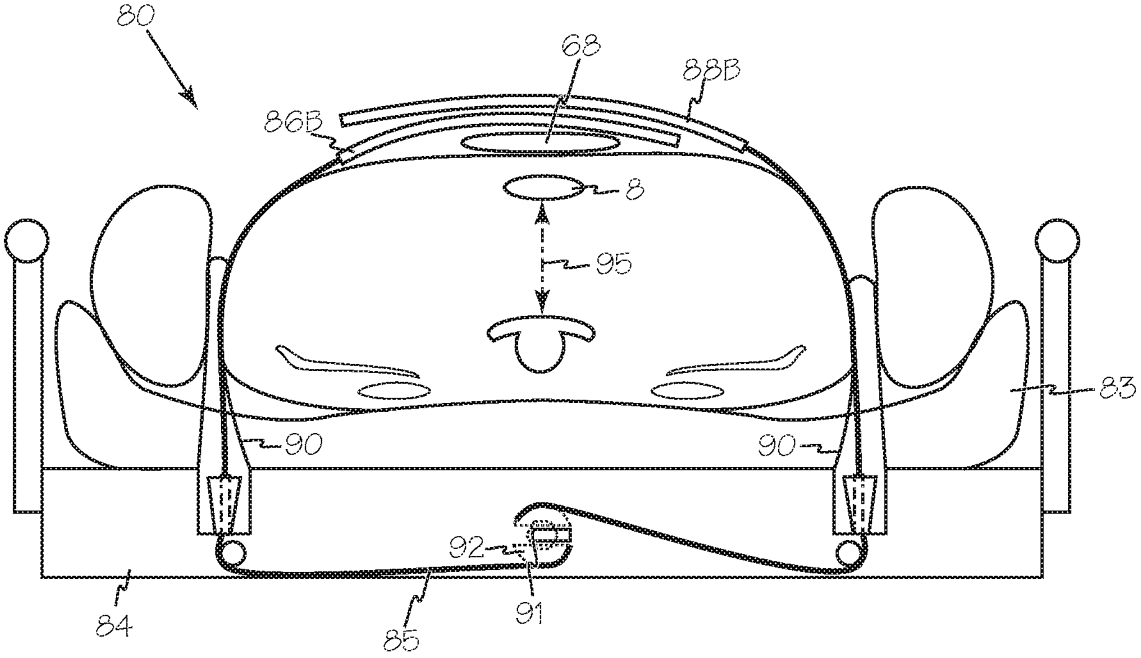
FIG. 11 is a cross-section view of the gurney and patient of FIG. 7 with the patient's chest compressed.

FIGS. 10 and 11 illustrate the operation of chest compression device 80 from the uncompressed positions of FIG. 10 to the compressed positions of FIG. 11. These illustrations include optional bladder 68. In use, patient 1 is placed supine on pad 83 which is on gurney deck 84, alternatively, the patient may be placed directly on gurney deck 84. Buckles 76 of pull straps engage clips 77 of belt 85 to provide a new or sterile upper compression belt 86 for the patient. The patient is oriented to bring pull straps 87A and 87B past the patient's axilla or armpits 88 permitting load distribution sections 89A and 89B to engage the patient's chest anterior to sternum 8. One or more force sensors such as force sensor 26 may be incorporated into the deck or the pad to measure the force applied by the compression belt to the patient's thorax. The output of the force sensors, sensor data 26A may be used by compression processor 56 (shown in FIGS. 8 and 9) to adjust the force applied to the patient. Similarly, force data 26A may also be provided to the device operator through interface 57 (shown in FIG. 8).

An optional accessory, a guide, shield, sleeve or sock such as guides 90 surrounds a portion of belt 85, pull straps 87A and 87B and buckles 76 to prevent abrasion and tissue injury to the patient's arm and chest adjacent to the belt path from the deck to the patient's chest. Guides 90 may be formed of any suitable material such as plastics, fabric or a combination.

Once the patient is positioned and the belt is secured, drive spool 91 tightens belt 85 as motor 92 turns the drive spool, thereby providing anterior-posterior or sternal compression the patient's chest as shown in FIG. 11. The application of anterior-posterior compression provided by the use of spindles 93 preferentially compresses sternum 8 towards spine 9 as illustrated in FIG. 10 with a stern to spine distance of 94 and the compressed thorax in FIG. 11 with a stern to spine distance 95 where the difference between uncompressed distance 94 and compressed distance 95 is the depth of compression suggested by the American Heart Association for chest compression resuscitation. The efficiency of the sternal compressions may be enhanced by the inclusion of optional bladder 68.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A patient support system, comprising:
a patient support apparatus comprising
a patient support deck,
a frame supporting the patient support deck,
a set of wheels coupled to the frame, and
a set of rails, each rail extending along one of the opposing lengthwise sides of the frame; and
a chest compression device configured to provide automatic chest compressions to a patient, the chest compression device comprising
a housing supporting a piston configured to provide the automatic chest compressions to the patient, and
at least two legs each coupled to the housing, wherein the at least two legs of chest compression device are each configured to be releasably secured to a given one of the set of rails, wherein,
upon securing the at least two legs, the chest compression device is configured to provide the automatic chest compressions to the patient when the patient is supine on the patient support deck and the piston is opposing the chest of the patient.

2. The patient support system of claim 1, wherein at least one leg of the at least two legs comprises an engagement element to secure the at least one leg to a given rail of the set of rails.

3. The patient support system of claim 1, wherein at least one leg of the at least two legs comprises a support element configured to rest on a given rail of the set of rails, such that the chest compression device is stabilized in part by the support element.

4. The patient support system of claim 1, further comprising a mattress disposed on the patient support deck.

5. The patient support system of claim 1, wherein the chest compression device comprises:
a motor configured to mechanically actuate the piston to cause application of a compressive force to a chest of the patient; and
a processor configured to control the operation of the motor to repetitively apply the compressive force to the chest of the patient.

6. A patient support system, comprising:
a patient support apparatus comprising
a patient support deck,
a frame supporting the patient support deck, wherein the frame comprises a first rail and a second rail positioned along opposing lengthwise sides of the frame, and
a set of wheels coupled to the frame; and
a chest compression device configured to provide automatic chest compressions to a patient, the chest compression device comprising a housing supporting a piston configured to provide the automatic chest compressions to the patient, and at least two legs each coupled to the housing;

wherein the at least two legs of chest compression device are each configured to releasably secure to the frame, wherein, upon securing the at least two legs, the chest compression device is configured to provide the automatic chest compressions to the patient when the patient is supine on the patient support deck and the piston is opposing the chest of the patient.

7. The patient support system of claim 6, wherein at least one leg of the at least two legs comprises an engagement element to secure the at least one leg to the frame.

8. The patient support system of claim 7, wherein the engagement element secures the at least one leg to the frame below an upper plane of the patient support deck.

9. The patient support system of claim 7, wherein the engagement element of the at least one leg secures the at least one leg to a given rail of the first rail and the second rail.

10. The patient support system of claim 6, further comprising a mattress disposed on the patient support deck.

11. The patient support system of claim 6, wherein the chest compression device comprises:

a motor configured to mechanically actuate the piston to cause application of a compressive force to a chest of the patient; and a processor configured to control the operation of the motor to repetitively apply the compressive force to the chest of the patient.

12. A patient support system, comprising:

a patient support apparatus comprising a patient support deck, a frame supporting the patient support deck, wherein the frame comprises a first rail and a second rail positioned along opposing lengthwise sides of the frame, and a set of wheels coupled to the frame; and a chest compression device configured to provide automatic chest compressions to a patient, the chest compression device comprising a housing supporting a piston configured to provide the automatic chest compressions to the patient;

wherein the chest compression device is configured to releasably secure to the patient support apparatus, wherein, upon securing the chest compression device, the chest compression device is configured to provide the automatic chest compressions to the patient when the patient is supine on the patient support deck and the piston is opposing the chest of the patient.

13. The patient support system of claim 12, wherein the chest compression device comprises at least two legs each coupled to the housing, wherein the at least two legs of the chest compression device are each configured to releasably secure to the patient support apparatus.

14. The patient support system of claim 13, wherein at least one leg of the at least two legs comprises an engagement element to secure the at least one leg to the patient support apparatus.

15. The patient support system of claim 14, wherein the engagement element secures the at least one leg to the frame below an upper plane of the patient support deck.

16. The patient support system of claim 14, wherein the engagement element of the at least one leg secures the at least one leg to a given rail of the first rail and the second rail.

17. The patient support system of claim 14, wherein the engagement element of the at least one leg secures the at least one leg to the patient support deck.

18. The patient support system of claim 12, further comprising a mattress disposed on the patient support deck.

19. The patient support system of claim 12, wherein the chest compression device comprises:

a motor configured to mechanically actuate the piston to cause application of a compressive force to a chest of the patient; and a processor configured to control the operation of the motor to repetitively apply the compressive force to the chest of the patient.

* * * * *